United States Patent [19]

Perkins et al.

[11] 3,919,439
[45] Nov. 11, 1975

[54] METHOD OF APPLICATION OF THPOH-NH$_3$ FIRE RETARDANT FINISH TO TEXTILES

[75] Inventors: Rita M. Perkins; Albert S. Cooper, Jr.; Timothy A. Calamari, Jr., all of Metairie; Harry B. Moore, New Orleans; Sidney P. Schreiber, Metairie, all of La.

[73] Assignee: The United States of America as represented by the Secretary of Agriculture, Washington, D.C.

[22] Filed: May 10, 1974

[21] Appl. No.: 468,952

[52] U.S. Cl. .................. 427/341; 8/116 P; 8/181; 427/342; 428/921
[51] Int. Cl.$^2$ ................ B44D 1/44; D06M 13/28; D06M 13/44
[58] Field of Search .......... 117/62, 62.1, 62.2, 136, 117/143 R; 8/116 P, 181; 427/341, 342; 428/921

[56] References Cited
UNITED STATES PATENTS

| | | | |
|---|---|---|---|
| 3,236,676 | 2/1966 | Coates et al. | 117/62.2 |
| 3,607,356 | 9/1971 | Beninate et al. | 117/62.2 |
| 3,775,155 | 11/1973 | Eggenweiler et al. | 117/62.2 |
| 3,799,738 | 3/1974 | Wagner | 8/181 |
| 3,846,155 | 11/1974 | Wagner | 117/136 X |

*Primary Examiner*—Michael R. Lusignan
*Attorney, Agent, or Firm*—M. Howard Silverstein; Max D. Hensley

[57] ABSTRACT

Fire resistance has been imparted by the application of an aqueous solution of tetrakis (hydroxymethyl) phosphonium hydroxide (heretofore referred to as THPOH) followed by heat drying to 2 to 8% moisture content; polymerizing, wholly or partially, the phosphorus compound in the cellulosic textile with ammonia gas in low concentration at about 65° to 95°C for 5 to 90 seconds; then rinsing in cold water, or completing the polymerization with dilute NH$_4$OH; oxidizing the phosphorus-nitrogen containing polymer; washing and drying. This invention provides an improved process for the production of fire resistant textiles, by accelerating the polymerization reaction and causing the overall process to be more adaptable to a continuous process. The finish is durable to repeated launderings.

1 Claim, No Drawings

METHOD OF APPLICATION OF THPOH-NH₃ FIRE RETARDANT FINISH TO TEXTILES

This invention relates to an improved process for treating fibrous textiles to render them fire resistant. Specifically, this invention relates to the treatment of textiles with an aqueous solution containing tetrakis(-hydroxymethyl)phosphonium hydroxide (heretofore referred to as THPOH), and said product polymerized on said fibrous materials with ammonia at elevated temperature to accelerate polymerization. The process is particularly useful in rendering cellulosic textiles fire resistant. The treated fabrics generally have an improved strength retention, good hand, and fire resistance which is durable to repeated laundering.

The textile treating solution suitable for use in this invention is a water solution, THPOH. The product can be prepared by any of several methods. The method of preparation is not a critical feature of this invention. The following two procedures are examples of suitable processes: (a) React phosphine with aqueous formaldehyde using suitable metal salts or catalysts. This process is fully described in German Pat. No. 1,041,957; (b) React tetrakis(hydroxymethyl)phosphonium chloride, THPC, with an equimolar quantity of an organic or inorganic base. The pH of the final solution should be in the range of about 7.1 to 8. For convenience the equilibrium treating solution is referred to as THP. The methylol groups of THP react with ammonia to form water insoluble thermosetting polymers that contain both phosphorus and nitrogen.

In the prior art, U.S. Pat. No. 3,607,356 discloses a process wherein flame resistance is imparted to fibrous textiles by application of an aqueous alkaline solution containing tris (hydroxymethyl) phosphine (heretofore referred to as THP) and tetrakis(hydroxymethyl)phosphonium hydroxide (heretofore referred to as THPOH) followed by heat drying to 10–20 percent moisture content, and finally polymerizing the phosphorous material in the fabric with ammonia vapor. The said invention provides a process for flameproofing textiles, particularly lightweight apparel fabrics whereby the resulting treated textile materials are rendered flame resistant with little or no loss in tearing strength and tensile strength or undesirable change in hand. Cellulose textiles treated by this process retain their flame resistant properties after repeated laundering. In a modification of U.S. Pat. No. 3,607,356, described in U.S. Pat. No. 3,775,155, the partially dry impregnated material is cooled for at least one minute before being exposed to ammonia gas to cause polymerization.

The process of the instant invention does not differ significantly from the process of U.S. Pat. No. 3,607,356 in the impregnation and drying steps of the process, except that the pH range of the aqueous treating solution is broader (6.2 to 7.9 for this invention as compared with 7.5 to 7.9 for the prior invention), and that the impregnated cellulosic material can be dried over a wide range of temperatures (150° to 320°F) to a lower moisture content of 2 to 8% for this invention, as compared to 10 to 20% for the prior one. The significant difference is the discovery that a faster, more efficient polymerization can take place in a reduced period of exposure time of the impregnated fabric to NH₃ gas; that is, the time of exposure of the fabric to the gas is reduced from a range of 2–6 minutes described in the prior process, to a more desirable range of from 5–90 seconds. Further, in the improved process, ammoniation takes place at elevated temperatures, 65° to 95°C, whereas in the prior process, ammoniation is at room temperature. In this improved process, the quantity of the NH₃ gas approaches the stoichimetric ratio of 1 mole of NH₃ per mole of THPOH. The phosphorus-nitrogen polymer may be completely formed in the ammoniation step of the process in which case the next step is a cold water rinse, or, alternately, the partially formed phosphorus-nitrogen polymer is further reacted in an aqueous NH₄OH solution of about 0.5 to 5%. A further improvement of this process is that the phosphorus-nitrogen containing polymer within and on the cellulosic material is oxidized, for example by spraying or padding a solution of hydrogen peroxide onto the polymer containing cellulosic material. Finally, the treated material is washed and dried.

It is therefore an object of the instant invention to provide an improved process for treating cellulosic textiles to render them substantially fire resistant.

A second object of this invention is to provide an improved process for flameproofing textiles, wherein said textiles are treated with an aqueous alkaline solution containing THPOH followed by heat drying to reduce the moisture content of the impregnated material to 2–8 percent, causing polymerization of the phosphorus material in the fabric with ammonia gas at elevated temperatures, and oxidizing the polymeric materials prior to a final washing and drying operation.

A third object of the invention is to provide an improved process for fireproofing very lightweight cellulosic fabrics used in apparel garments, wherein the resulting treating textile fabrics are made durably fire retardant and undergo substantially no reduction in tear strength and no undesirable change in hand. This invention is not limited to lightweight cellulosic fabrics but can be used with heavy fabrics, as for example 8 oz. tubular knit, or with cellulosic materials in the form of yarn.

Still another object of this invention is to provide a method of producing textiles which retain their imparted fire retarding properties after a multiplicity of washings.

These and other objects of this invention will be apparent to those skilled in the art of making fire retardant cellulosic materials.

The procedure in accordance with this invention comprises: Exposure to ammonia gas at temperatures from about 65° to 95°C, the partially dried (2 to 8% moisture content) THPOH-impregnated cellulosic material, to initiate the formation of an insoluble polymer with the phosphonium reaction product (THPOH) within the fibrous cellulosic or other textile material. The polymerization can be completed at this step in the process, or, the partially polymerized phosphorus-nitrogen containing material is then further treated with aqueous NH₄OH from about 0.5 to 5% concentration. If the polymerization reaction is completed with the gaseous ammonia, the NH₄OH treatment can be omitted, and a cold water rinse substituted in its place.

The phosphorus-nitrogen containing polymer is then oxidized with an aqueous solution of about 10% H₂O₂ by dipping the cellulosic material in the oxidizing solution to a wet pickup of about 140%, and then allowing sufficient time for the reaction to be completed, or by spraying the oxidizing solution onto the cellulosic material.

The above treated material is then washed and dried, as in the prior art.

Because one object of this invention is a faster and higher temperatures, overdrying can cause reduced efficiency of polymerization, as seen in the example of the sample dried for 1 minute at 320°F.

TABLE 1

| Dry Temp. °F. | Dry Time min. | $H_2O$ % | Phos. % | Nit. % | DOC Orig. | DOC 50X | Phos. % | Nit. % | DOC Orig. | DOC 50X | Phos. % | Nit. % | DOC Orig. |
|---|---|---|---|---|---|---|---|---|---|---|---|---|---|
| | | | | | mole ratio 2:1 | | | | mole ratio 3:1 | | | mole ratio 1:1 | |
| 150 | ½ | 15.2 | 4.2 | 2.0 | P | F | 4.5 | 2.3 | P | F | | | |
| " | 1 | 3.6 | 4.1 | 1.6 | P | F | 4.3 | 2.1 | P | P | 2.9 | 0.6 | BL |
| " | 2 | 2.6 | 4.1 | 1.6 | BL | P | | | | | | | |
| 200 | ½ | 7.9 | 4.0 | 1.8 | P | BL | 4.2 | 1.7 | P | P | 3.2 | 0.9 | F* |
| " | 1 | 2.3 | 4.3 | 1.9 | P | P | | | | | | | |
| " | 2 | 2.5 | 4.0 | 1.6 | P | P | 4.5* | 2.1 | P | P | | | |
| 260 | ¼ | 6.6 | 4.4 | 1.8 | P | F | 4.2 | 2.0 | P | P | 2.0 | 1.3 | F** |
| " | ½ | 2.3 | 3.7 | 1.8 | BL | — | | | | | | | |
| " | 1 | 2.2 | 3.3 | 1.4 | BL | — | 3.2* | 1.4 | P | P | | | |
| 320 | ¼ | 5.9 | 4.3 | 2.0 | P | P | 4.5 | 2.3 | P | P | 1.1 | 0.6 | F** |
| " | ½ | 2.1 | 3.9 | 1.8 | P | P | | | | | | | |
| " | 1 | 2.3 | 1.2 | 0.6 | F** | | 1.8* | 0.7 | F** | | | | |

Flannelette Padded with 35% THPON; 20 seconds exposure to hot $NH_3$
P = passed   F = failed   BL = borderline
DOC = Dept. of Commerce Flammable Fabrics Children's Sleepwear Standard (DOC FF 3-71)
*Mole ratio of 4:1 of $NH_3$ to THPOH
**Assumed failures more efficient process than that described in U.S. Pat. No. 3,607,356, the preferred technique in the process of the instant invention is to pad, squeeze, dry, and then enter the $NH_3$ reactor as part of a sequence in a continuous process. However, this is not to indicate that batch processing could not be accomplished with suitable modifications.

In accordance with this invention, any fibrous material, but in particular a cellulosic textile, is impregnated with the aqueous THPOH solution by padding, although other impregnating techniques may be used; the excess solution is removed by passing the textile through squeeze rolls, centrifuging or other methods.

The cellulosic material is then dried to a residual moisture content ranging from 2 to 8 percent. The drying temperature can vary widely although 150° to 320°F is preferred. The drying time varies and is dependent upon temperature and fabric weight and construction. The moisture content of the dried cellulosic material is measured by any conventional method.

In Table I, data is presented to illustrate the wide range of drying temperatures (from 150° to 320°F) resulting in moisture contents on the fabric of about 2 to 15% and then ammoniated for 20 seconds at 3 different rates of $NH_3$ flow. At each temperature, there were samples that passed the DOC FF3-71 flammability test after 50 laundry cycles. The preferred range of residual water in the fabric after drying is about 2 to 8%. At the The dried impregnated cellulosic material is exposed to gaseous ammonia in an enclosed chamber to form an insoluble fire retardant polymer within the material. The ammoniation takes place at a temperature from about 65° to 95°C. The chemical curing is carried out for a period of time sufficient to effect substantially complete polymerization and curing of the impregnated composition. In many instances, curing times within the range of 5 seconds to 90 seconds have been found to be typical depending on the amount of resin add-on in the treated material, as well as the nature of the cellulosic material itself.

When the polymerization is completed in the ammoniation step of the process, a cold water rinse follows. When the ammonia concentration and the time of exposure of the THPOH-impregnated fabric to the ammonia are at the upper range of ammoniation conditions, complete polymerization can occur in the ammonia reactor. Table II provides data illustrating the relationship among mole ratio of $NH_3$ to THPOH, of ammonia exposure time, and of ammonia flow rate on polymer formation and durability.

TABLE II

| Sample No. | $NH_3$ flow moles/min.* | Time of $NH_3$ exposure sec. | Phos. % | Nit. % | Results of VFT after No. of launderings 0 | 50 | Mole ratio of $NH_3$:THPOH |
|---|---|---|---|---|---|---|---|
| 1 | 1.25 | 40 | 3.6 | 1.5 | P | P | 4:1 |
| 2 | 1.25 | 20 | 3.5 | 1.3 | P | P | 2:1 |
| 3 | 1.25 | 10 | 2.9 | 1.1 | P | F | 1:1 |
| 4 | 1.25 | 5 | 2.3 | 0.8 | P | F | 0.5:1 |
| 5 | 0.5 | 40 | 3.1 | 1.0 | P | P | 1.7:1 |
| 6 | 4.3 | 5 | 3.3 | 1.2 | P | F | 1.7:1 |

P = passed
F = failed
VFT - vertical flame test
*1.25 moles/cu.ft.
Lightweight sheeting padded with 40% THPOH, dried for 45 sec. at 145°F It is readily seen that polymerization can occur under conditions of exposure ranging from 5 to 40 seconds at $NH_3$ to THPOH mole ratios ranging from less than 1:1 to 4:1; however, the durability of the finish is dependent upon adequate initial polymer formation, which requires at least about a 2:1 ratio as seen in samples 1 through 4. When samples 2 and 5 are compared, the mole ratio remains close to constant 2:1 vs 1.7:1, the exposure time increased by a factor of 2 and the $NH_3$ flow adjusted. Both have similar durability as measured by their ability to pass the Vertical Flame Test after 50 launderings. A comparison of samples 5 and 6 illustrates an example where mole ratio is constant, but exposure time is inadequate for complete polymerization for comparable durability of the finish. This then would require an additional polymerization step in the process which can be done by a further reaction in aqueous $NH_4OH$.

When conditions of ammoniation are such that polymerization is not completed in the ammonia reactor, a dilute ammonium hydroxide step is included in the process.

In Table III, a comparison is made between samples of flannelette treated by the process of this invention in which an ammonium hydroxide step is included in the treatment and in which the $NH_4OH$ step is omitted. The DOC FF 3–71 flammability test is a more rigid test than the Vertical Flame Test. All of the samples that had an $NH_4OH$ rinse following exposure to $NH_3$ gas, had adequate fire resistance to pass the DOC test before laundering and at least the Vertical Flame Test after 50 launderings. None of the samples that received the $H_2O$ rinse after the $NH_3$ gas exposure passed the DOC test after 50 launderings although nearly all passed the Vertical. Samples that were given the $NH_4OH$ rinse rather than the $H_2O$ rinse, had higher polymer add-on as evidenced by the increase in phosphorus and nitrogen contents. One concludes, therefore, that the $NH_4OH$ rinse following the $NH_3$ gas step, increases polymerization when conditions are such that incomplete polymerization has occurred at the ammonia reactor.

period for the reaction to be completed before entering the washing and drying steps.

The cellulosic materials treated in accordance with the procedures which have been described above are durably flame retardant even after repeated launderings. Additionally, these materials have strength and hand substantially unchanged from those of untreated materials. Moreover, very lightweight cellulosic textile fabrics treated by this process are found to have the good properties mentioned above, particularly the retention of a good hand.

To summarize, the instant invention discloses a process for imparting flame resistance to lightweight fibrous textiles, and the products obtained by said process wherein the process is a series of steps comprising:

a. impregnating a fibrous cellulosic textile with a THPOH solution having a pH of about 6.2 to 7.9 and from about 10 to 40 percent to a wet pickup of about from 60 percent to 115 percent, b. drying the wet impregnated fibrous textile to a moisture content of about from 2 to 8%, c. treating the partially dried fibrous textile with a low concentration of ammonia gas in a suitable chamber for about from 5 sec to 90 sec at 65° to 95°C to deposit within and on the fibrous structure of the textile a polymerized phosphorus-containing substance which is relatively insoluble to common solvents, d. further reacting the partially polymerized phosphorus-nitrogen-containing material, when necessary, with a solution of $NH_4OH$ of from about 0.5 to 5%, e. treating the phosphorus-nitrogen containing polymer within and on the material with an oxidizing material, such as hydrogen peroxide, and f. washing and drying the polymer-containing fibrous textile to remove unreacted substances to obtain a fire

TABLE III

| | Time of $NH_3$ exposure | Mole ratio $NH_3$:THPOH | Phos. % | Nit. % | Results of DOC* after no. of launderings 0 | 50X | Results of VFT after 50 launderings |
|---|---|---|---|---|---|---|---|
| 3% $NH_4OH$ | 40 sec | 4:1 | 4.5 | 2.0 | P | P | — |
| | 40 sec | 1.7:1 | 4.5 | 1.6 | P | BL | 2.83 |
| | 20 sec | 2:1 | 4.8 | 2.0 | P | P | — |
| | 10 sec | 2:1 | 4.7 | 1.9 | P | P | — |
| | 10 sec | 1:1 | 3.9 | 1.7 | P | BL | 2.67 |
| | 5 sec | 1.6:1 | 4.7 | 2.0 | P | BL | 2.67 |
| Cold $H_2O$ | 40 sec | 4:1 | 3.7 | 1.5 | P | BL | 2.75 |
| | 40 sec | 1.7:1 | 3.7 | 1.3 | F | F | 3.08 |
| | 20 sec | 2:1 | 3.6 | 1.4 | P | BL | 2.83 |
| | 10 sec | 2:1 | 3.5 | 1.4 | P | F | 2.67 |
| | 10 sec | 1:1 | 2.8 | 1.0 | F | F | BL |
| | 5 sec | 1.6:1 | 3.8 | 1.3 | F | BL | 2.75 |

P = passed
F = failed
BL = borderline
*DOC FF 3-71 = Dept. of Commerce Flammable Fabrics Children's Sleepwear Standard
Flannelette padded with 35% THPOH aqueous solution, dried on tenter frame at 150°F for 2 min.
A sample is rated as passing when the average char of 5 specimens does not exceed 7.0 inches.

The oxidation of the polymer can be accomplished by any convenient method as normally practiced by those skilled in the art. For example, an aqueous solution of the oxidizing material can be sprayed or padded onto the textile material in and on which the fire retarding polymer has formed. The preferred oxidizing material is $H_2O_2$. A convenient method is to dip the treated material in an aqueous solution of 10% $H_2O_2$ to a wet pickup of about 140% and then allow a sufficient time resistant product.

Salts other than the tetrakis (hydroxymethyl)phosphonium chloride can be used. However, the chloride is preferred because it is commonly available commercially.

Treated fabrics were tested by the following: flammability tests were either the Vertical Flame Test, U.S. Fed. Supply Service, "Textile Test Methods," Fed. Spec. CCC - T191b Method 5902, U.S. Gov. Printing Office (1951), or the DOC FF 3–71, Dept. of Commerce Children's Sleepwear Std., Text. Chemist and Colorist, Vol. 4, No. 9, p. 71, 1972; bursting test measurements, Fed Std 191; and stiffness measurements, Amer. Soc. for Testing Materials, ASTM Designation D1388-64.

The following examples illustrate the methods of carrying out the invention but the invention is not restricted to these examples.

EXAMPLE 1

The Improved Process

The THPOH solutions were prepared according to the established method which consists of the addition of cold aqueous NaOH to cold aqueous THPC. The temperature of the solutions should be kept about 20°C throughout the addition. The solution pH reaches 7.0–7.9. This requires a mole ratio of NaOH:THPC of about 0.9:1.0. An aqueous solution was prepared by slowly adding and continuously stirring a solution of 1.75 parts of NaOH dissolved in 12.7 parts of water to 14.0 parts of an 80% THPC solution. About 50 ml of a wetting agent was added to the padding solution. A roll of cotton flannelette was padded with this solution to a wet pickup of about 110%. The impregnated fabric was dried at 320°F for 40 seconds in an electrically heated oven. The partially dried fabric was then exposed to $NH_3$ at about 70°C for 40 seconds at an $NH_3$ flow rate of about 1.25 moles/min. Next, the fabric was padded with an aqueous 3% $NH_4OH$, squeezed, and after a lag time of about 2 minutes was padded with 10% $H_2O_2$ and lightly squeezed. Oxidation took place on the fabric (less than 1 minute dwell time) before it entered the first wash box. After 3 hot running water washes, the fabric was squeezed on a padder and dried on a tenter frame. The process from the padding of the THPOH to the final wash was done continuously at about 3 yd/min. The treated flannelette passed the DOC FF 3-71 test with a char length of 2.4 inches, warp, and 2.0 inches, filling.

Although ammoniation can take place in any convenient ammonia reactor, the process was particularly successful when the reaction took place in a vertical reactor. The reactor used in these examples consists of a reaction chamber that is 6 feet tall, 18 inches wide, and about 1 inch thick between the wall faces. These walls are made of corrugated fiberglass reinforced plastic which assists in keeping the gas turbulent. Just outside the chamber are steam heating tubes which keep the reaction chamber at the desired temperature. There is insulation between the reaction chamber and the outside hardboard walls. Fabric enters the reactor at the bottom and travels vertically between and against the slitted pipes to exit at the top. The $NH_3$ gas is heated in a steam heat exchanger before entering the reaction chamber through pipes, horizontally positioned along the 18-inch width. An exhaust above the reactor removes the byproducts. More efficient use of the $NH_3$ can be accomplished by recirculating the gaseous materials from the top of the reactor back through the heat exchanger where it is mixed with fresh $NH_3$ and then pumped into the reactor, etc.

EXAMPLE 2

The Advantage of Hot Ammoniation

This example illustrates the advantage of hot ammoniation rather than room temperature ammoniation. An aqueous solution was prepared as in Example 1. Flannelette samples were padded to a 105% wet pickup then dried on the gas heated tenter frame for 2 minutes or 4 minutes at 145°F to a residual water content of 5 or 4.5% respectively. The partially dried samples were exposed to $NH_3$ gas at room temperature or at elevated temperature (about 70°–75°C). Table IV shows that polymer formation in the ammonia reactor is favored at the higher temperature when the mole ratio of $NH_3$ to THPOH compound approaches the stoichiometric quantity of 1 to 1.

TABLE IV

| Drying Time min. | Residual $H_2O$ % | $NH_3$ exposure sec. | $NH_3$ flow moles/min. | THPOH moles/min. | R.T. Phos. % | $NH_3$ N % | Hot Phos. % | $NH_3$ N % |
|---|---|---|---|---|---|---|---|---|
| 2 | 5.0 | 10 | 1.2 | 1.2 | 3.6 | 0.7 | 4.3 | 1.6 |
| 2 | 5.0 | 30 | 0.7 | 0.4 | 2.4 | 1.8 | 4.8 | 1.8 |
| 2 | 5.0 | 10 | 4.3 | 1.2 | 4.7 | 2.2 | 4.6 | 2.1 |
| 4 | 4.5 | 10 | 1.2 | 1.2 | 2.2 | 0.9 | 4.0 | 1.7 |
| 4 | 4.5 | 30 | 0.7 | 0.4 | 1.9 | 1.8 | 4.3 | 1.9 |
| 4 | 4.5 | 10 | 4.3 | 1.2 | 4.9 | 2.1 | 5.0 | 2.2 |

EXAMPLE 3

The Advantage of a Lower pH of the Padding Solution

The advantage of using a padding solution of a pH lower than 7–8 is that the amount of formaldehyde released during processing is materially reduced providing more acceptable conditions during mill processing to the mill workers. This example will illustrate the success of the treatment at a solution pH of 6.2. Flannelette was padded with an aqueous solution of THPOH prepared as in Example 1, except that NaOH neutralization of the THPC solution was stopped when the solution pH reached 6.2. The impregnated fabric was dried at 160°F for 1-½ minutes, then ammoniated with hot $NH_3$ (about 90°C) for 60 seconds at an $NH_3$ flow rate of about 1-¼ moles/min, further reacted with 3% aqueous $NH_4OH$, oxidized with 10% $H_2O_2$, washed, and dried. The treated fabric had a phosphorus content of about 4%, and char lengths after 50 launderings of 1.40 inches (warp) and 2.20 inches (filling) as measured by the DOC FF 3-71 test.

EXAMPLE 4

Application of the Process to Ball Warp Yarn

An aqueous solution was prepared as in Example 1, except that 0.95 parts of NaOH was dissolved in 4.55 parts of water and added to 7.0 parts of an 80% aqueous solution of THPC. Five hundred yards of 40/2 plain ball warp yarn having 189 ends was impregnated with this padding solution by passing them through a three-roll pad in sheet form to give about a 90 percent wet pickup. The impregnated yarn was dried in a forced draft oven for ½ minute at about 230°F. The moisture content was about 3 percent. The yarn was then passed through the vertical ammonia curing chamber where the temperature was about 65°C. Dwell time was about 30 seconds. The ammonia flow rate was about 1-¼ moles per minute. The sheet of yarns was next passed through a three percent ammonium hydroxide solution, squeezed to about 75% wet pickup, then oxidized by passing through a ten percent hydrogen peroxide solution. The yarn was then washed and dried. The yarn speed was about four yards per minute. The treated yarn had an average phosphorus content of about 3.75% percent and an average nitrogen content of about 1.75%. The yarn was resistant to buring and formed a black char upon ignition with a match.

EXAMPLE 5

Application of Improved Process to Knitted Fabrics
An aqueous solution was prepared as in Example 1. Fifty yards of 8 oz/yd$^2$ tubular knit cotton fabric was padded, dried, exposed to $NH_3$ gas at elevated temperature, with the $NH_3$ flow of about 3 moles/min, rinsed in cold running tap $H_2O$, oxidized, washed, and dried. The treated fabric had 3.8% phosphorus and 1.9% nitrogen and an average weight gain of 12-15%. Bursting strength of the original material was 99 pounds, finished 100 pounds, and after 50 washes 94 pounds. After 50 launderings as described in the DOC FF 3-71 the char length was 1.25 inches and the nitrogen retention 90%.

EXAMPLE 6

An aqueous solution was prepared as in Example 4, had a pH = 7.1, and was stored overnight at about 30°C. A sample of flannelette was padded to a wet pickup of about 102%, dried at 320°F for 15 seconds to a moisture content of about 5.9%, then exposed to $NH_3$ in the vertical reactor for 20 seconds at about 80°-85°C with an $NH_3$ flow rate of about 1-¼ moles/min, rinsed with cold water, oxidized with $H_2O_2$, washed, and dried. Fabric speed through the $NH_3$ reactor was about 6 yards/min. The treated fabric had 4.3% P and 2.0% N, and passed the DOC FF3-71 test with a char length of 2.2 inches after 50 launderings. The untreated control fabric had a warp stiffness measurement of $3.2 \times 10^{-4}$, the treated $15.2 \times 10^{-4}$ (Tinius-Olsen), before chemical or mechanical softening. This illustrates the fact that the THPOH solution is adequately stable so that neutralization of the THPC can be done at least 24 hours in advance.

Cotton flannelette was also treated at a lower concentration of THPOH (30% solids) and passed the DOC FF 3-71 test after 50 laundry cycles. Lightweight cotton sheeting and cotton printcloth are examples of some other types of fabric that have been successfully treated with this process; a padding solution of about 40% concentration was required.

We claim:

1. In a process for imparting flame retardance to fibrous cellulosic textiles which process comprises (a) impregnating the textile with monomeric tris(hydroxymethyl)phosphine hydroxide, (b) drying the impregnated textile and (c) exposing the dry textile to gaseous ammonia and allowing the ammonia to react with the tris(hydroxymethyl)phosphine hydroxide, the improvement comprising performing step (c) at a temperature of about from 65° to 95° C.

* * * * *